(12) United States Patent
Horaguchi

(10) Patent No.: US 7,367,506 B2
(45) Date of Patent: May 6, 2008

(54) IMAGE READING APPARATUS

(75) Inventor: Yoichi Horaguchi, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 442 days.

(21) Appl. No.: 11/033,135

(22) Filed: Jan. 12, 2005

(65) Prior Publication Data

US 2005/0157356 A1    Jul. 21, 2005

(30) Foreign Application Priority Data

Jan. 14, 2004    (JP)    ............... 2004-007270

(51) Int. Cl.
*G06K 7/10*    (2006.01)
(52) U.S. Cl. ................................... 235/454
(58) Field of Classification Search ............... 235/454
See application file for complete search history.

(56) References Cited

U.S. PATENT DOCUMENTS 4,380,579 A * 4/1983 Matsumoto et al. ..... 430/125.3

6,892,945 B2    5/2005  Shishido

FOREIGN PATENT DOCUMENTS

| JP | A 62-294376 | 12/1987 |
| JP | A 62-294377 | 12/1987 |
| JP | A-10-98589 | 4/1998 |
| JP | A 2001-358907 | 12/2001 |
| JP | A-2002-296704 | 10/2002 |
| JP | A-2003-134307 | 5/2003 |

* cited by examiner

*Primary Examiner*—Karl D. Frech
(74) *Attorney, Agent, or Firm*—Oliff & Berridge, PLC

(57) ABSTRACT

An image reading apparatus, including a transparent plate, a positioning member which is provided on the transparent plate so as to define, on one of opposite sides of the positioning member, a reading place where a sheet having an image is placed, and which positions the sheet placed on the reading place, an image taking device, a housing which supports the transparent plate and accommodates the image taking device such that the image taking device is movable below, and along, the transparent plate, and a reading control portion which controls the image taking device to take, through the transparent plate, the image from the sheet placed on the reading place, while the image taking device is moved below, and along, the transparent plate. The positioning member is detachably attached to the housing.

25 Claims, 11 Drawing Sheets

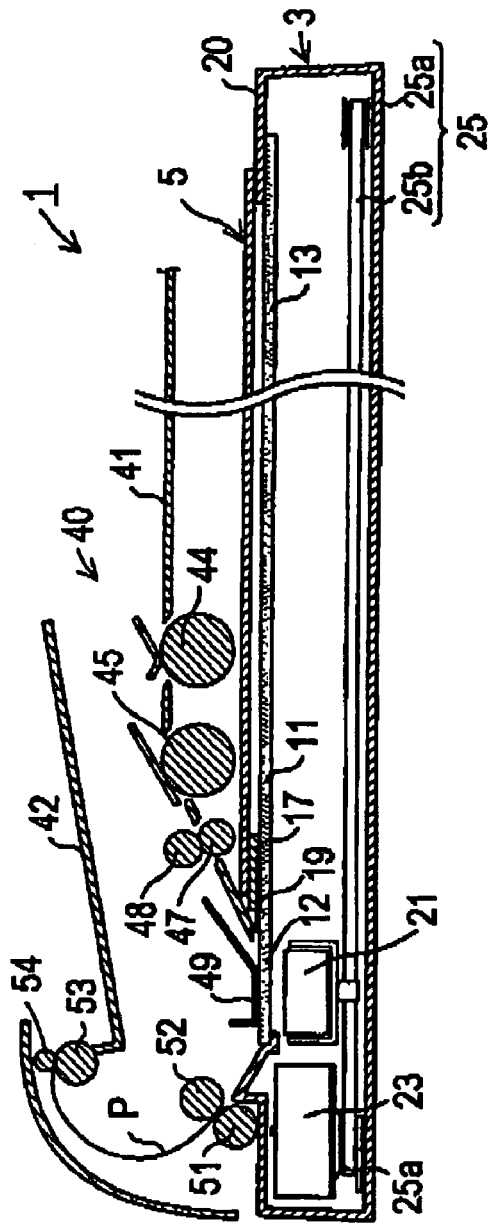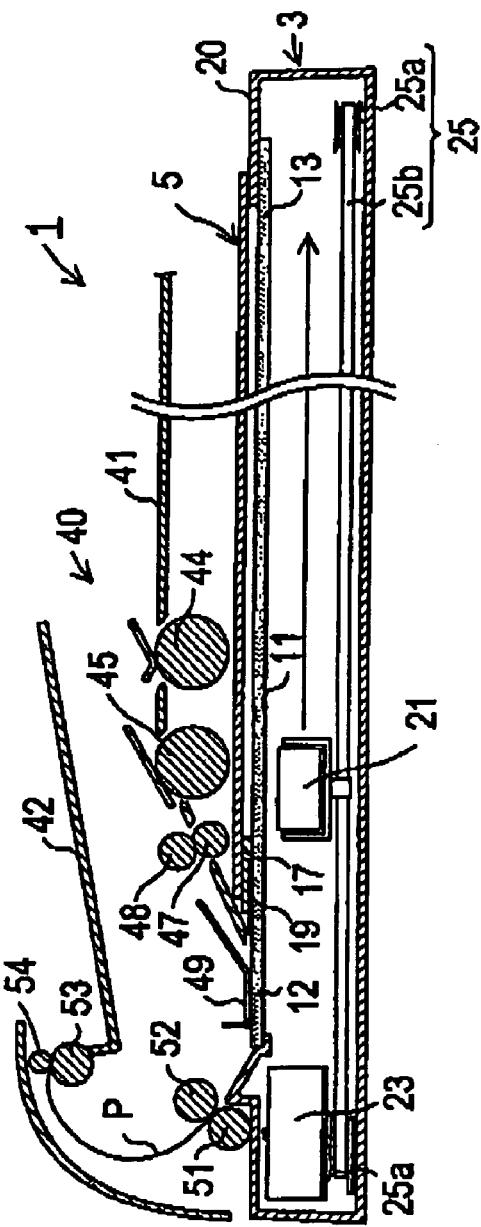

IMAGE READING APPARATUS

The present application is based on Japanese Patent Application No. 2004-007270 filed on Jan. 14, 2004, the contents of which are incorporated herein by reference.

BACKGROUND OF THE INVENTION

1. Field of the Invention

The present invention relates to an image reading apparatus that optically reads, with an image taking device, an image on a sheet, e.g., an original.

2. Discussion of Related Art

There has conventionally been known an image reading apparatus including a glass plate defining a reading surface or place on which an original having an image is placed; an image taking device that is provided below the glass plate and optically takes the image; and an image processor that produces image data based on the image taken by the image taking device. There has also been known another image reading apparatus additionally including an original feeding device (i.e., an automatic document feeder, ADF) that feeds an original to be read, to a reading place.

For example, Japanese Patent Application Publication P2001-358907A1 discloses a double-reading-place (DRP) image reading apparatus including an image king device and an original feeding device, and having a first reading place and a second reading place. In this image reading apparatus, the image king device, positioned below the first reading place, is moved to read an image on an original placed by a user on the first reading place. The oil feeding device is used in such a manner that an original placed on a sheet-supply tray of the original feeding device is fed to the second reading place and, when the original is fed through the second reading place, the image taking device, positioned below the second reading place, reads an image on the original.

Generally, a DRP image reading apparatus including an original feeding device has many functions common to those of a single-reading-place (SRP) image reading apparatus not including an original feeding device. Therefore, many common components or parts can be used to produce the two sorts of image reading apparatuses.

SUMMARY OF THE INVENTION

However, in the DRP image reading apparatus including the original feeding device and having the two reading places, a complicated portion of the apparatus that surrounds the reading places needs to be assembled in a different manner than a manner in which the SRP image reading apparatus not including the feeding device is assembled. Therefore, for example, in the case where the DRP image reading apparatus as disclosed by the above-indicated document is modified into an SRP image reading apparatus not including an original feeding device, the complicated portion of the former apparatus that surround the reading places needs to be fully disassembled and then be reassembled.

Thus, it has conventionally been difficult to modify a DRP image reading apparatus including an original feeding device into an SRP image reading apparatus not including an original feeding device, or vice versa, and it has been also difficult to manage the stock of those products and/or their parts.

In addition, in the conventional DRP image reading apparatus having the two reading places, the complicated portion of the apparatus that surrounds the two reading places cannot be easily disassembled, and accordingly it is difficult to remove dust or the like from small gaps present in the complicated portion. In many cases, a white standard member that is used to correct image data obtained by an image taking device is provided in the complicated portion surrounding the reading places. However, since the complicated portion cannot be easily disassembled, it is difficult to clean the standard member or replace it with a new one. Thus, there has been such a problem that the standard member is stained, because of its long-time use, with dust or the like, lowering an image reading performance of the apparatus. In addition, even if the standard member is stained when the image reading apparatus is manufactured in a factory and it needs to be replaced with a clean one, it cannot be easily removed from the apparatus.

In the above-described technical background, the present invention has been developed. It is therefore an object of the present invention to provide an image reading apparatus free of at least one of the above-indicated problems. It is another object of the present invention to provide an image reading apparatus that can be easily modified from a DRP type including a sheet feeding device into an SRP type not including a sheet feeding device, or vice versa. It is another object of the present invention to provide an image reading apparatus in which a portion thereof surrounding reading places can be easily maintained. It is another object of the present invention to provide an image reading apparatus in which a standard member can be easily replaced with another standard member.

According to the present invention, there is provided an image reading apparatus, including a transparent plate, a positioning member which is provided on the transparent plate so as to define, on one of opposite sides of the positioning member, a first reading place where a first sheet having a first image is placed, and which positions the first sheet placed on the first reading place, an image taking device, a housing which supports the transparent plate and accommodates the image taking device such that the image taking device is movable below, and along, the transparent plate, and a first reading control portion which controls the image taking device to take, through the transparent plate, the first image from the first sheet placed on the first reading place, while the image taking device is moved below, and along, the transparent plate. The positioning member is detachably attached to the housing.

In the image reading apparatus in accordance with the present invention, the positioning member is detachably attached to the housing. Since the positioning member is detachable from the housing, the positioning member and the transparent plate can be easily maintained. For example, dust or the like that might enter gaps between the positioning member and the transparent plate and/or the housing can be easily removed.

In addition, the positioning member and the housing are separate members that are detachably attached to each other. Therefore, in the case where a sheet feeding device is not employed by the present apparatus, and a positioning member that can cover a second reading place is attached to the housing, the present apparatus can apparently function as being an SRP image reading apparatus not including a sheet feeding device. Thus, the present image reading apparatus can be easily modified from being a DRP image reading apparatus including a sheet feeding device to an SRP image reading apparatus not including the sheet feeding device, or vice versa.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 3A is a cross-section view of the image reading apparatus 1, taken in a lengthwise direction thereof in a state in which a second reading place 12 is used to read an image;

FIG. 3B is another cross-section view of the image reading apparatus 1, taken in the lengthwise direction thereof in a state in which a first reading place 11 is used to read an image;

DETAILED DESCRIPTION OF THE PREFERRED EMBODIMENTS

Figure 1A:
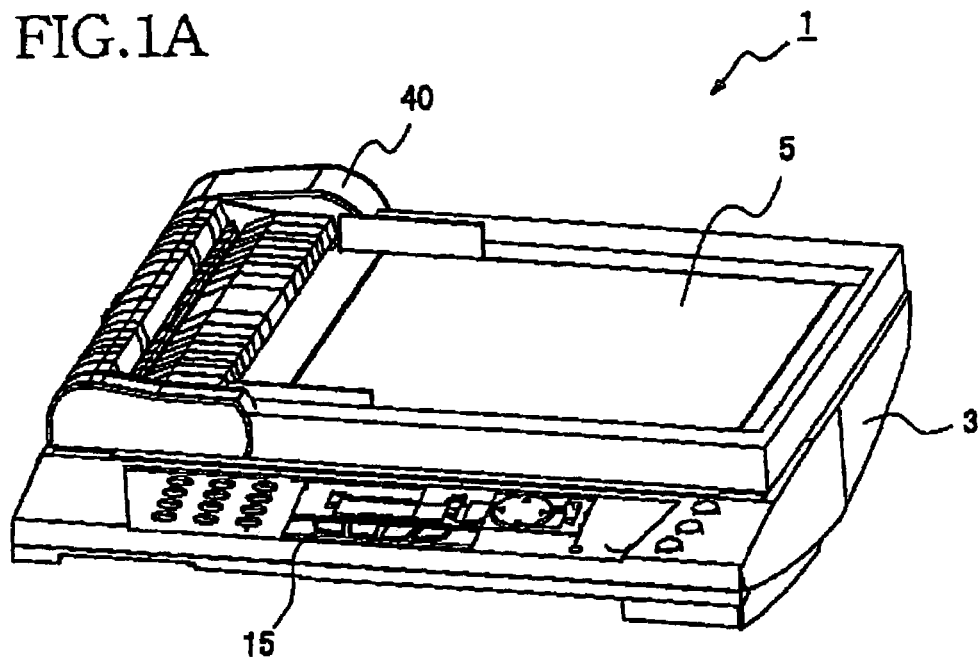
FIG. 1A is a perspective view of an external appearance of a double-reading-place (DRP) image reading apparatus 1 as a first embodiment of the present invention, in a state in which a cover member 5 is closed to cover a main body 3.
Figure 2:
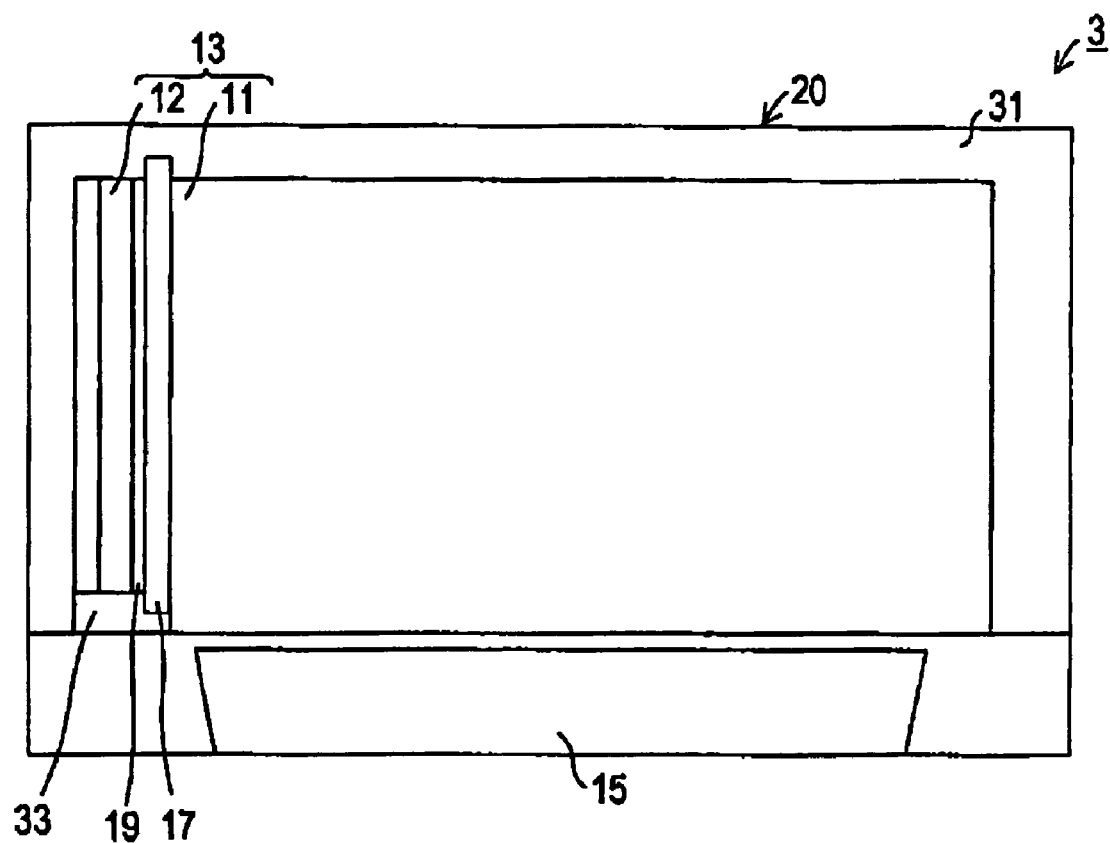
FIG. 2 is a plan view of an upper portion of the main body 3.
Figure 13:
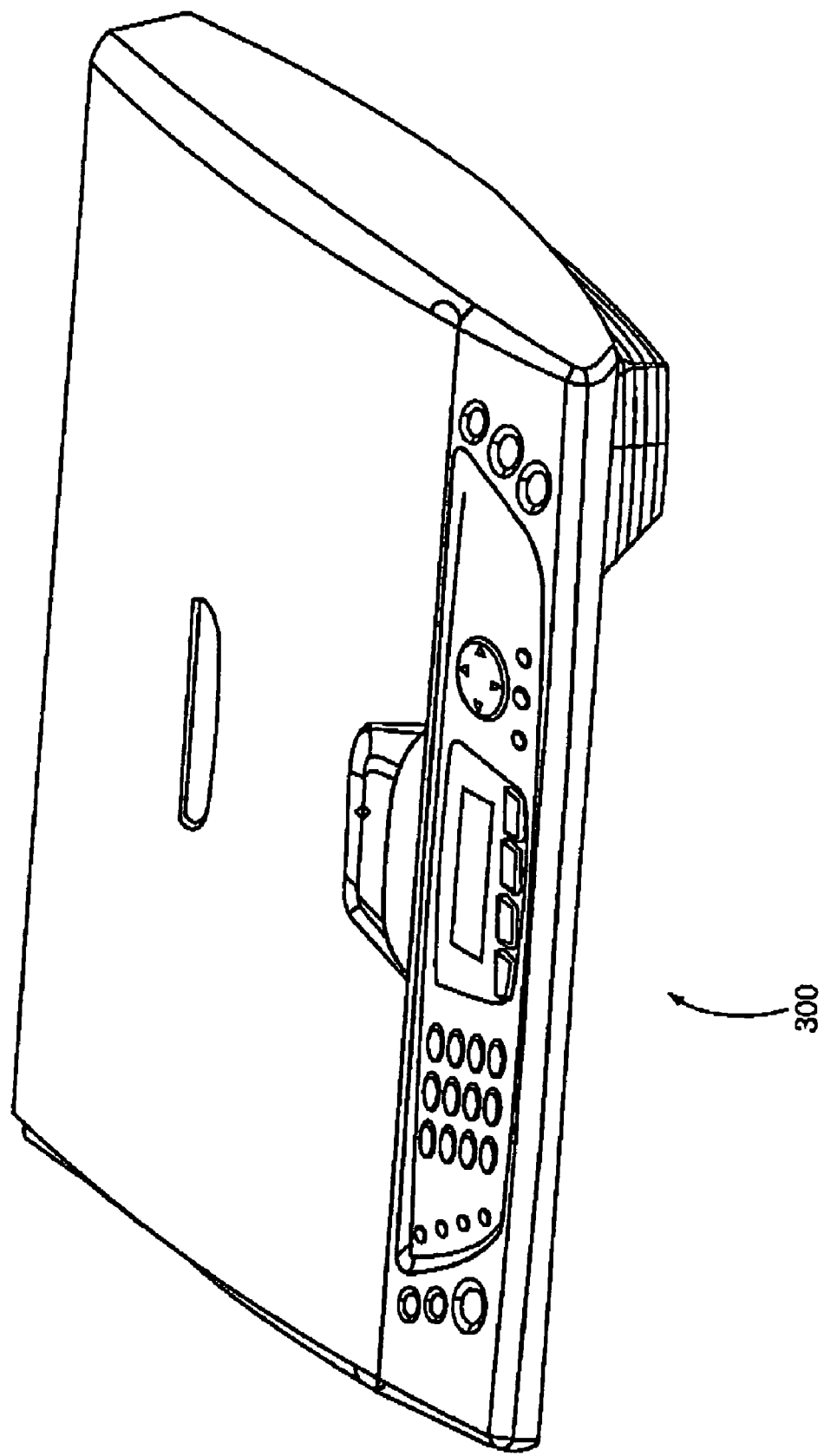
FIG. 13 is a perspective view of a single-reading-place (SRP) image reading apparatus 300 as a fifth embodiment of the present invention.

Hereinafter, there will be described preferred embodiments of the present invention by reference to the drawings. FIGS. 1A and 13 each show an external appearance of a double-reading-place (DRP) image reading apparatus 1 to which the present invention is applied; and FIG. 2 shows an upper portion of a main body 8 of the DRP image reading apparatus 1.

The DRP image reading apparatus 1 is so constructed as to function as a so-called flat-bed-type scanner, and includes the main body 3 and a cover member 5 that is provided above the main body 3 such that the cover member 5 can be pivoted upward and downward. The main body 3 has, in the upper portion thereof two reading places, i.e., a first reading place 11 and a second reading place 12.

Figure 1B:
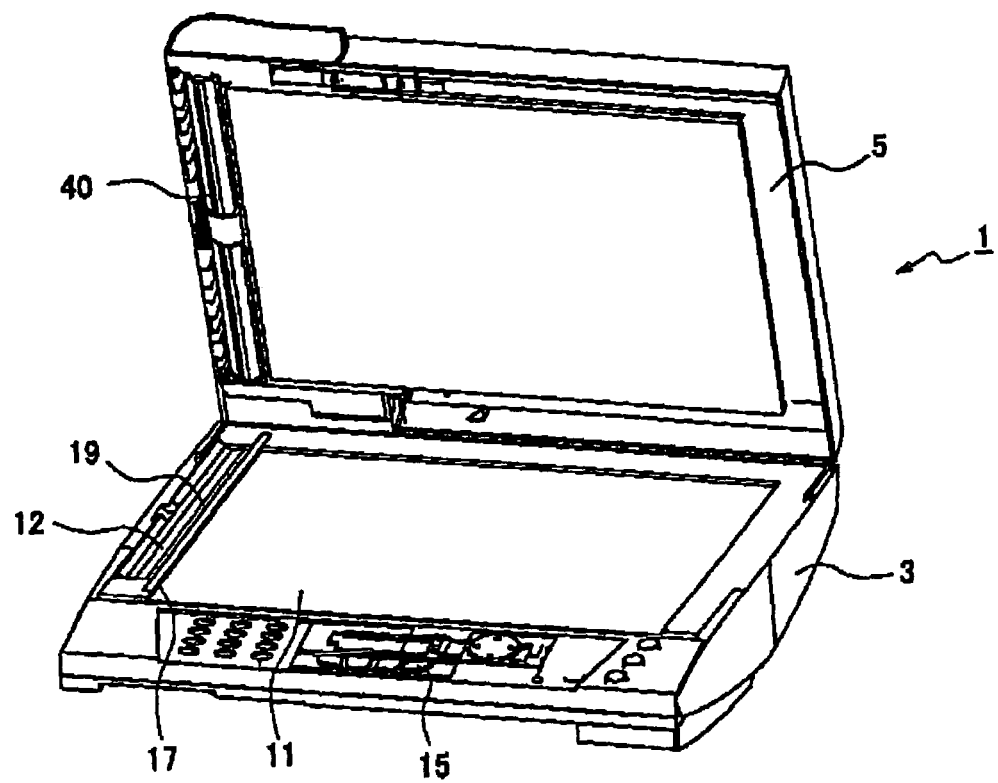
FIG. 1B is a perspective view of another external appearance of the image reading apparatus 1 in a state in which the cover member 5 is opened to expose the main body 3.

As shown in FIG. 1A, the upper portion of the main body 3 is covered by the cover member 5 closed. FIG. 1A shows the DRP image reading apparatus 1 in a state in which the cover member 5 is closed; and FIG. 1B shows the DRP image reading apparatus 1 in a state in which the cover member 5 is opened.

The main body 8 has, in a front portion thereof an operation panel 15 including various keys and switches. When a user inputs a command by operating the operation panel 15, the DRP image reading apparatus 1 carries out an operation corresponding to the inputted command.

Figure 4A:
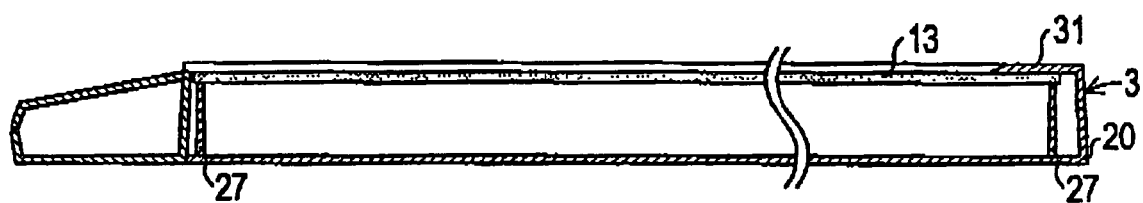
FIG. 4A is a cross-section view of the main body 3, taken in a widthwise direction thereof, for explaining a manner in which a platen glass 13 defining the first and second reading places 11, 12 is supported by the main body 3.
Figure 4B:
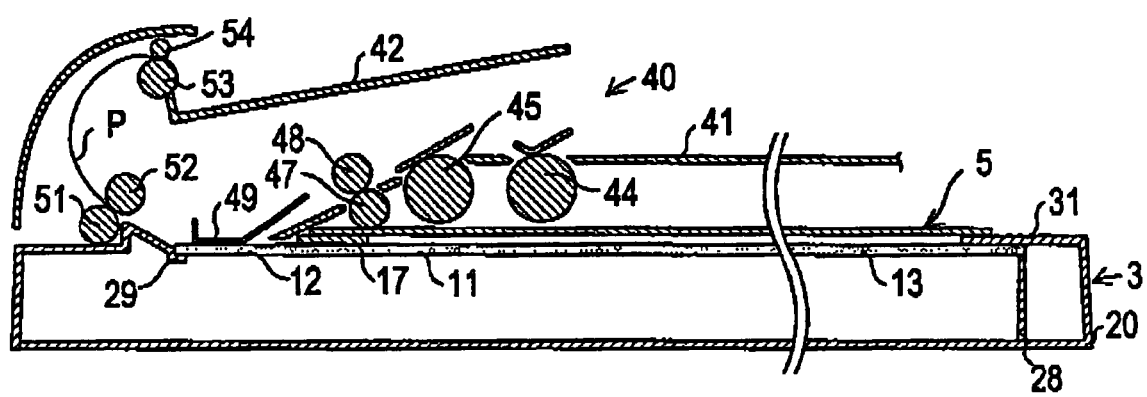
FIG. 4B is a cross-section view of the image reading apparatus 1, taken in the lengthwise direction thereof for explaining the above-indicated manner.

FIGS. 3A and 3B each show a cross section of the DRP image reading apparatus 1, taken in a lengthwise direction thereof, i.e., in a left-right direction in FIG. 1A. FIGS. 4A and 4B each illustrate a manner in which a platen glass 13 as a transparent plate that defines the first and second reading places 11, 12 is supported by the main body 3. In FIGS. 4A and 4B, electric devices etc. accommodated by a support box 20 as a housing are not shown.

The main body 3 of the DRP image reading apparatus 1 includes the above-indicated platen glass 13 defining the first and second reading places 11, 12, the support box 20 supporting the platen glass 13, a positioning member 17, a white standard member 19, an image sensor 21 as an image taking device, an electric motor 23, and a power transmitting device 25. The electric motor 23 and the power transmitting device 25 cooperate with each other to provide a moving device that moves the image sensor 21. The platen glass 13 is constituted by a plane transparent glass plate. The positioning member 17 is for positioning an original as a first sheet having a first image, on the first reading place 11. The positioning member 17 is formed of an elastically deformable material, such as a plastic plate or a metallic plate. The electric motor 23 produces power to move the image sensor 21. The power transmitting device 25 transmits the power produced by the motor 23, to the image sensor 21, so as to move the same 21 below the platen glass 13.

The support box 20 has a generally parallelepiped shape opening upward. The platen glass 13 is supported by the support box 20, such that the platen glass 13 is provided in the upper opening of the box 20. The support box 20 is provided with a pair of first glass-support portions 27, a second glass-support portion 28, and a third glass-support portion 29 that cooperate with each other to support a lower surface of the platen glass 13.

FIG. 4A shows a cross section of the DRP image reading apparatus 1, taken in a front-rear direction thereof perpendicular to a lengthwise direction thereof. The two first glass-support portions 27 are provided in a front portion and a rear portion of the support box 20, respectively, such that the first portions 27 extend upward from a bottom wall of the box 20 and extend in the lengthwise direction of the apparatus 1, i.e., in a left-right direction in FIG. 4B. Thus, the two first glass-support portions 27 support respective lower surfaces of a front end portion and a rear end portion of the platen glass 13, respectively.

As shown in FIG. 4B, the second glass-support portion 28 is provided in a right-hand end portion of the support box 20, such that the second portion 28 extends upward from the bottom wall of the support box 20 and extends in the front-rear direction of the DRP image reading apparatus 1. Thus, the second glass-support portions 28 supports a lower surface of a right-hand end portion of the platen glass 13. FIG. 4B shows a cross section of the DRP image reading apparatus 1, taken in the lengthwise direction thereof. The third glass-support portion 29 extends from a left-hand upper end of the support box 20, and supports a lower surface of a left-hand end portion of the platen glass 13.

The rear end portion and right-hand end portion of the platen glass 13 supported by the support portions 27, 28, 29 are held down, and are fixed to the support box 20, by a frame portion 31 that extends from edges of an upper end of the support box 20 in respective directions toward a center of the same 20, substantially parallel to the bottom wall of the same 20. A front and left-hand end portion of the plate glass 13 is held down, and is fixed to the support box 20, by a glass hold-down portion 33 that extends from an edge of a front and left-hand end portion of the frame portion 31. Thus, the platen glass 13 is prevented from coming off the support box 20.

In the DRP image reading apparatus 1, the platen glass 13 is sectioned into the first and second reading places 11, 12 by the positioning member 17 that is detachably attached to the support box 20. The first reading place 11 is for reading the image on the original placed by the user, and is provided in a right-hand portion of the main body 3, as shown in FIG. 2. Meanwhile, the second reading place 12 is or reading an image as a second image formed on an original P as a second sheet that is fed by an original feeding device 40 (i.e., an automatic document feeder, ADF, FIG. 4) that is integrally assembled with the cover member 5. The second reading place 12 is provided in a left-hand portion of the main body 3.

The image sensor 21 is accommodated in the support box 20, such that the sensor 21 is movable, below the first and second reading places 11, 12, i.e., the transparent platen glass 13, in a left-right direction in FIGS. 3A and 3B. The image sensor 21 includes a light emitter, not shown, that emits a light toward an original placed on the platen glass 13, and a plurality of photoelectric transducers, not shown, each of which receives the light reflected from the original and produces an image signal representing the read pixel image. The image sensor 21 is constituted by a well-known "line sensor" that has an elongate light-receive surface as long as a width of the platen glass 13 as measured in the front-rear direction of the apparatus 1, and continuously reads each line of the original image. The line sensor 21 includes a plurality of image sensing elements arranged in one array in the front-rear direction of the apparatus 1.

The power transmitting device 25 includes two pulleys 25a, 25a and a belt 25b wound on the two pulleys 25a, and the image sensor 21 is fixed to a portion of the belt 25b. When the belt 25b is moved by the power produced by the electric motor 23, the image sensor 21 is moved below, and along, the platen glass 13 in the left-right direction in FIGS. 3A and 3B.

FIG. 3A shows a fixed position where the image sensor 21 is stopped to read the original P being fed through the second reading place 12 by the original feeding device 40 provided in the cover member 5; and FIG. 3B shows a manner of movement of the image sensor 21 to read the original placed on the first reading place 11.

When the image sensor 21 reads the original P being fed through the second reading place 12 by the original feeding device 40 provided in the cover member 5, the sensor 21 is moved to, and positioned at, the fixed position below the second reading portion 12. Meanwhile, when the image sensor 21 reads the original placed on the first reading place 11, the sensor 21 is moved in the left-right direction, below the first reading portion 11, by the cooperation of the motor 23 and the power transmitting device 25.

The original feeding device 40 is integrally assembled with the cover member 5, and includes a sheet-supply tray 41 provided above the first reading place 11. The original feeding device 40 feeds the original P placed on the sheet-supply tray 41, to the second reading place 12, and discharges the original P whose image has been read on the second reading portion 12 by the image sensor 21, into a sheet-collect tray 42.

The original feeding device 40 includes, at a start point of a sheet-feed path, two sheet-supply rollers 44, 45. When the sheet-supply rollers 44, 45 are rotated while being pressed against the original P, the original P is fed from the sheet-supply tray 41 toward a downstream-side end of the sheet-feed path. A pair of feed rollers 47, 48 are provided on a downstream side of the sheet-supply rollers 44, 45. The original P fed from the upstream-side end of the sheet-feed path is pinched by the two feed rollers 47, 48. As the feed rollers 47, 48 are rotated while pinching the original P, the original P is fed toward the downstream-aide end of the sheet-feed path.

On a downstream side of the feed rollers 47, 48, there is provided a hold-down plate 49 that is opposed to the second reading place 12 such that an appropriate space is left between a lower surface of the hold-down plate 49 and an upper surface of the platen glass 13 defining the second reading place 12. The original P fed from the feed rollers 47, 48 is passed through the space present between the hold-down plate 49 and the second reading place 12, and is further fed to a pair of feed rollers 51, 52 provided on a downstream side of the plate 49.

The two feed rollers 51, 52, provided on the downstream side of the second reading place 12, pinch the original P fed from the upstream-side portion of the sheet-feed path and, as the feed rollers 51, 52 are rotated, the original P is fed to a pair of discharge rollers 53, 54 provided on a downstream side of the feed rollers 51, 52. The two discharge rollers 53, 54 pinch the original P fed from the feed rollers 51, 52 and, as the discharge rollers 53, 54 are rotated, the original P is discharged into the sheet-collect tray 42.

Figure 5:
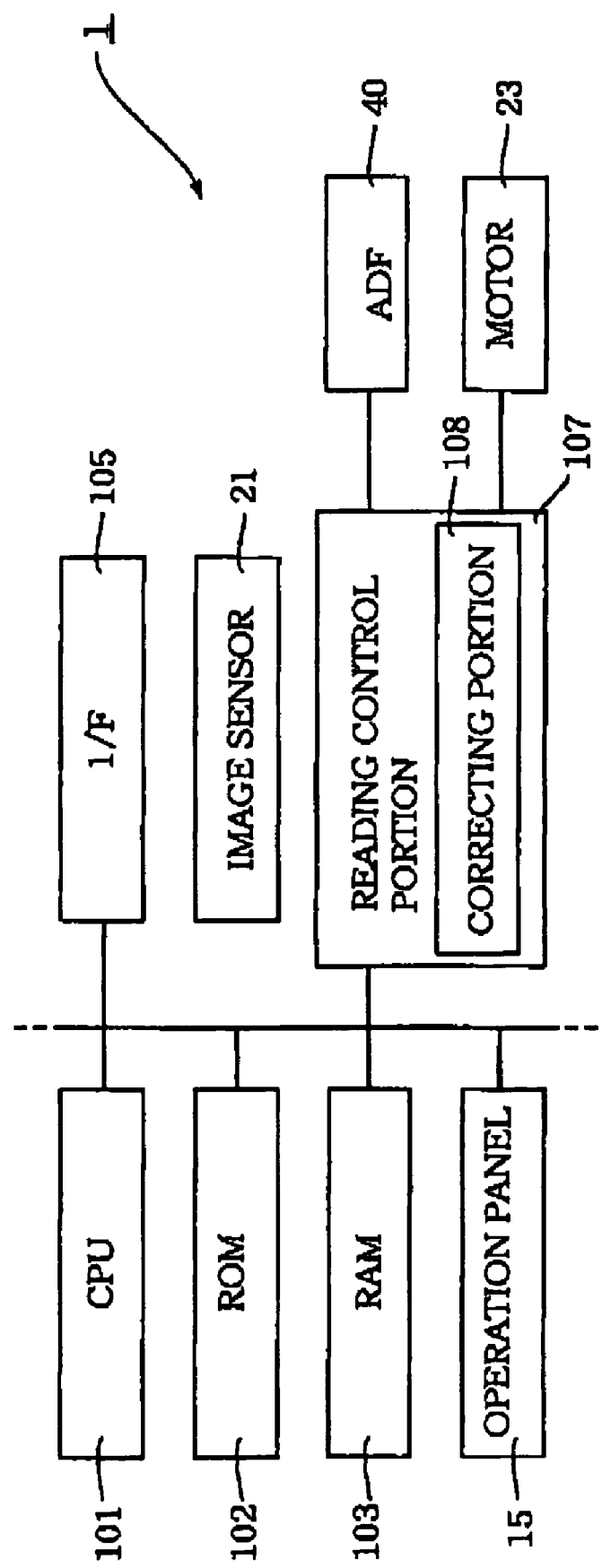
FIG. 5 is a diagrammatic view for explaining an electric arrangement of the image reading apparatus 1.

As shown in FIG. 5, the original feeding device 40 is controlled by a reading control portion 107 that is incorporated by the main body 3. The DRP image reading apparatus 1 employs a computer including a CPU (central processing unit) 101, a ROM (read only memory) 102, a RAM (random access memory) 103, an interface (I/F) 105, the operation panel 15, and the reading control portion 107. The reading control portion 107 includes a correcting portion 108 for correcting image data representing the image taken by the image sensor 21. The CPU 101 controls the elements 102, 103, 106, 15, 107.

Figure 6B:
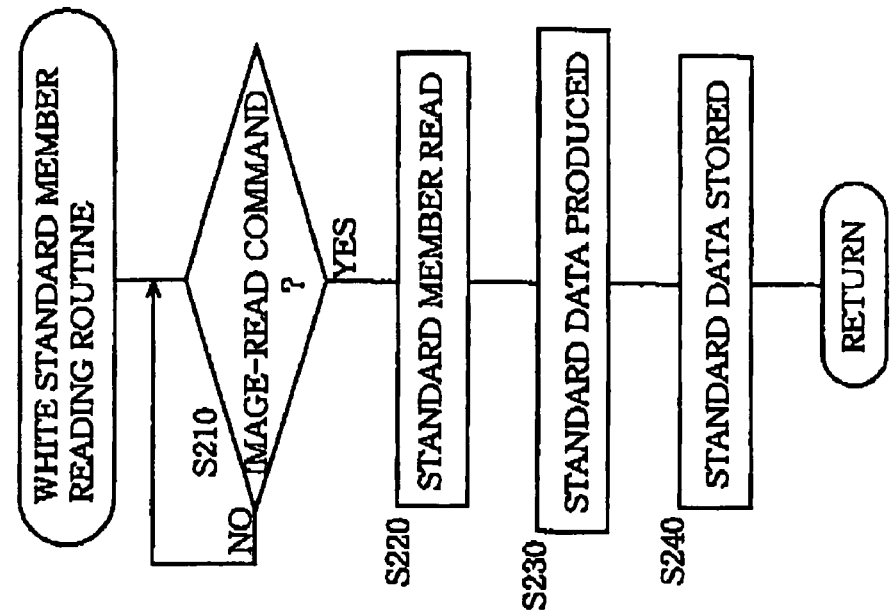
FIG. 6B is a flow chart representing a white-standard reading routine that is carried out by the CPU 101.
Figure 6A:
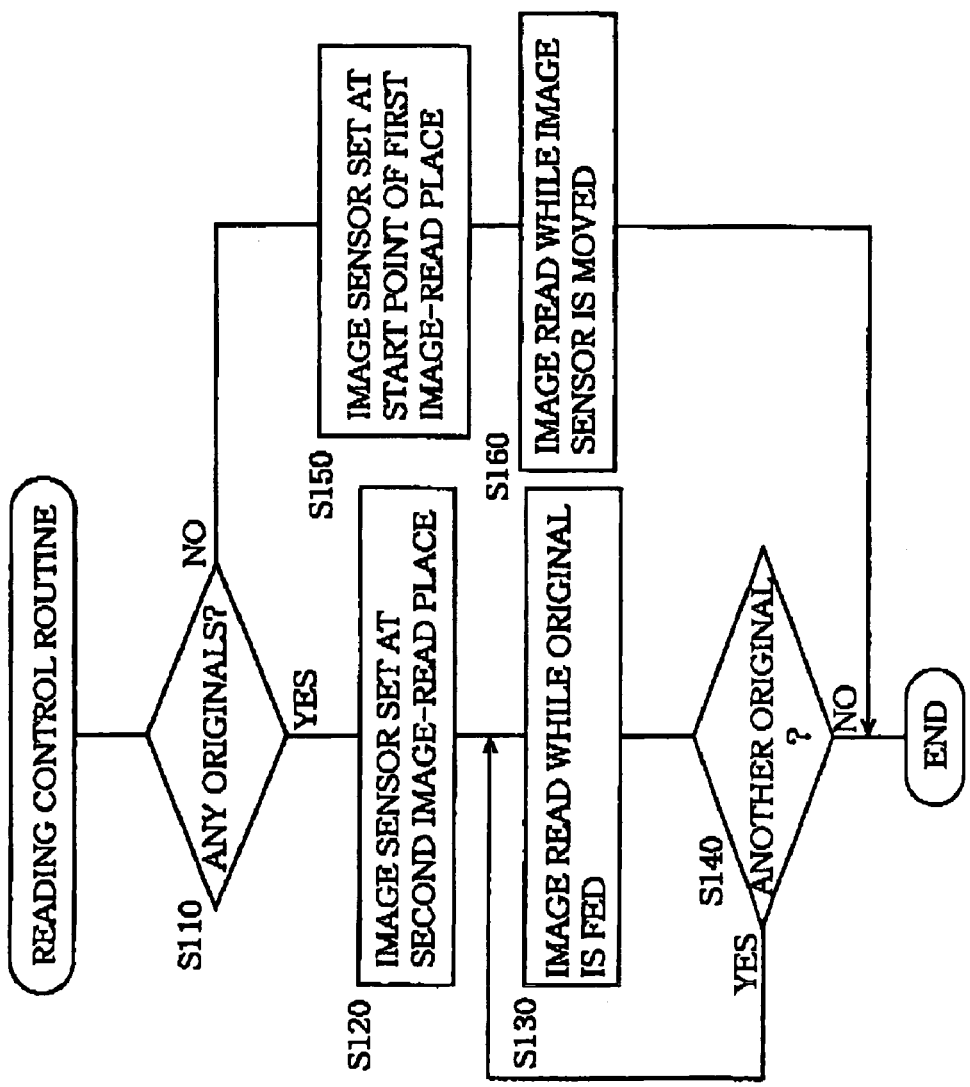
FIG. 6A is a flow chart representing a reading control routine that is carried out by a CPU 101.

More specifically described, when the user inputs an image-read command by operating the operation panel 15, the CPU 101 carries out a reading control routine that is pre-stored in the ROM 102 and is represented by a flow chart shown in FIG. 6A. First, at Step S110, the CPU 101 judges, based on an output signal supplied from a sheet sensor, not shown, whether an original P is placed on the sheet-supply tray 41 of the original feeding device 40. If a positive judgment is made at Step S110, the control of the CPU 101 proceeds with Step S120 to supply, to the reading control portion 107, a command to move the image sensor 21 to the fixed position below the second reading place 12.

Responsive to the above command, the reading control portion 107 controls the electric motor 23 to move the image sensor 21 to the fixed position below the second reading place 12, and stops or positions the sensor 21 at the fixed position. Subsequently, at Step S130, the CPU 101 commands the reading control portion 107 to control the original feeding device 40 to feed a sheet of original P from the sheet-supply tray 41 to the second reading place 12 and, when the original P is passed over the second reading portion 12, control the image sensor 21 to read an image formed on the original P.

The image signal outputted from the image sensor 21 is digitized by a converter circuit as a portion of the reading control portion 107. In addition, the digitized image signal (hereinafter, referred to as the image data) is subjected, by the correcting portion 18, to, e.g., a well-known shading correction based on standard data, described later. The corrected image data are temporarily stored in the RAM 103 and, under control of the CPU 101, the image data are supplied via the interface 105 to, e.g., an external device such as a personal computer or an image forming device such as a printer.

Step S130 is followed by Step S140 to judge whether another sheet of original P is present on the sheet-supply tray 41. If a positive judgment is made at Step S140, the control goes back to Step S130 to carry out the above-described reading operation. That is, the image formed on the original P is read, and the obtained image data are supplied via the interface 105 to the external device. On the other hand, if a negative judgment is made at Step S140, i.e., if there are no sheets of original P left on the sheet-supply tray 41, the CPU 101 quits the reading control routine.

Meanwhile, if a negative judgment is made at Step S110, i.e., if there are no sheets of original P on the sheet-supply tray 41, the control of the CPU 101 goes to Step S150 to supply, to the reading control portion 107, a command to move the image sensor 21 to a movement start point, i.e., a boundary point between the first reading place 11 and the positioning member 17. Responsive to this command, the reading control portion 107 controls the electric motor 23 to move the image sensor 21 to the movement start point below the first reading place 11.

Then, the control of the CPU 101 goes to Step S160 to command the reading control portion 107 to control the motor 23 to move the image sensor 21 below the first reading place 11 in the left-right direction in FIG. 3B, and concurrently control the image sensor 21 to read the original placed on the first reading place 11. In short, the CPU 101 operates for controlling the image sensor 21 to read the original placed on the first reading place 11, while moving the image sensor 21 below the platen glass 13.

At Step S160, the image signal outputted from the image sensor 21 is digitized by the converter circuit of the reading control portion 107, and the thus obtained image data are subjected, by the correcting portion 108, to the well-known shading correction based on the standard data, described later. The corrected image data are temporarily stored in the RAM 103 and, under control of the CPU 101, the image data are supplied via the interface 105 to the external device.

After Step S160, the CPU 101 quits the reading control routine shown in FIG. 6A. The standard data used by the correcting portion 108 are produced and updated by the CPU 101 according to a white-standard reading routine that is pre-stored in the ROM 102 and is represented by a flow chart shown in FIG. 6B.

In the white-standard reading routine, first, at Step S210, the CPU 101 judges whether an image-read command has been inputted through the operation panel 15. If a positive judgment is made at Step S210, the CPU 101 carries out, before the above-described Step S120 or S150, Steps S220 through S240 described below.

At Step S220, the CPU 101 commands the reading control portion 107 to move the image sensor 21 to a position right below the white standard member 19. Responsive to this command, the reading control portion 107 controls the electric motor 23 to move the image sensor 21 to the position right below the white standard member 19. Then, the CPU 101 commands the reading control portion 107 to control the image sensor 21 to read a standard white color or image of the white standard member 19, and obtains an image signal representing the read standard image, through the reading control portion 107.

Step S220 is followed by Step S230 to produce, based on the image signal representing the read standard image, the standard data to be used by the correcting portion 108 to correct the image data obtained from the original by subjecting the image data to the well-known shading correction. At Step S240, the CPU 101 stores, in the RAM 103, the standard data (i.e., correction data) obtained at Step S230, so that the standard or correction data may be read out of the RAM 103 by the correcting portion 108 and be used in the shading correction. Then, the CPU 101 quits the standard-white reading routine.

Figure 7A:
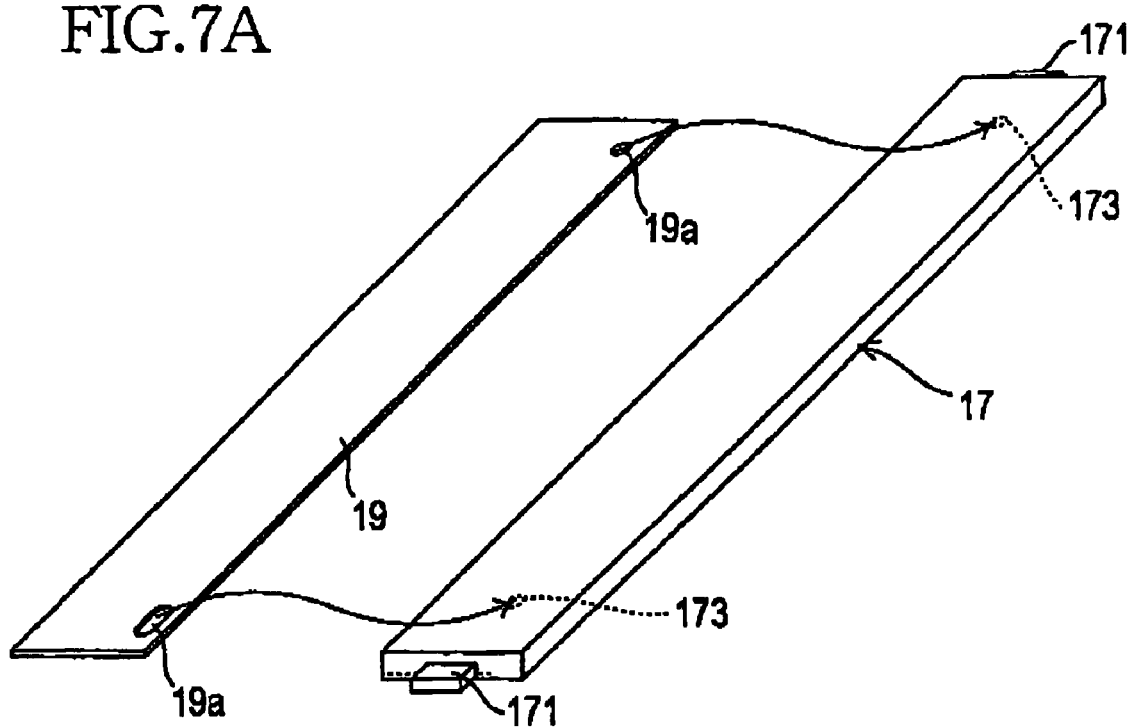
FIG. 7A is a perspective view of a positioning member 17, showing a state in which a white standard member 19 is not attached to the positioning member 17.
Figure 7B:
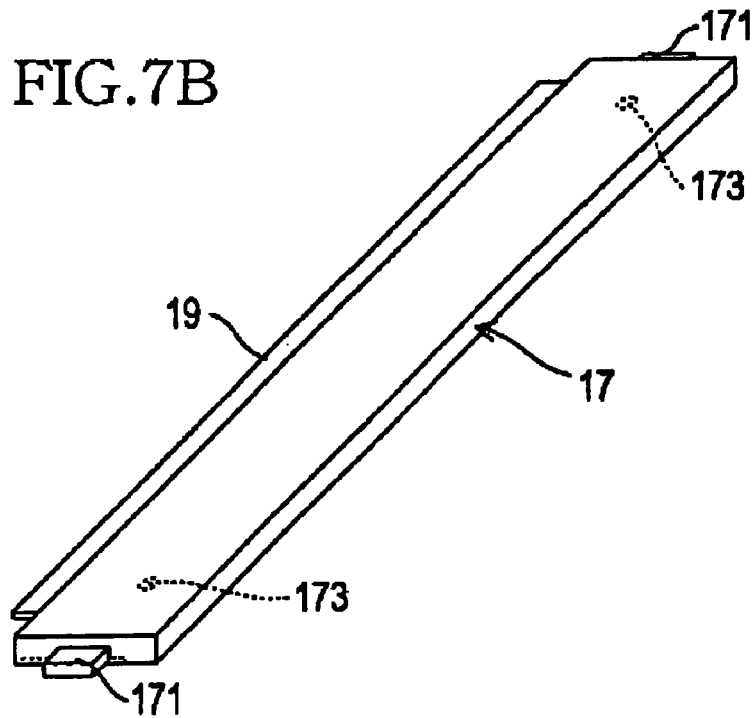
FIG. 7B is a perspective view of the positioning member 17, showing a state in which the white standard member 19 is attached to the positioning member 17.

Meanwhile, in the present embodiment, the white standard member 19 is detachably attached, as shown FIGS. 7A and 7B, to a lower surface of the positioning member 17 that is detachably attached to the support box 20. FIG. 7A shows a state in which the white standard member 19 is detached from the positioning member 17; and FIG. 7B shows a state in which the white standard member 19 is attached to the positioning member 17.

Figure 8A:
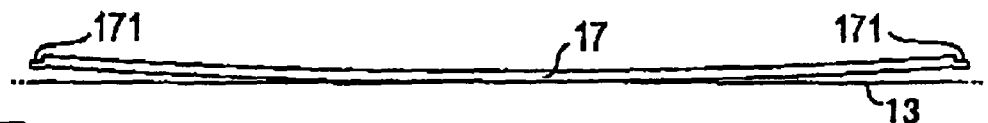
FIG. 8A is a side elevation view of the positioning member 17 whose lengthwise middle portion is curved toward a platen glass 13.
Figure 8B:
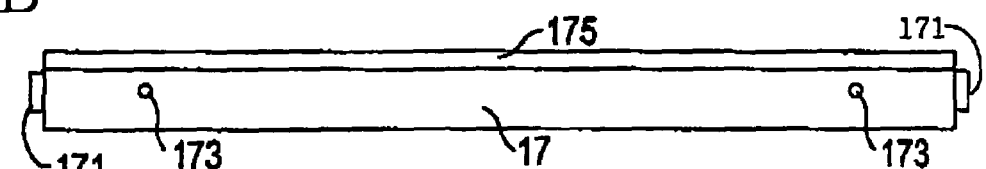
FIG. 8B is a bottom view of the positioning member 17.

FIGS. 8A and 8B show a long side surface, and the lower surface, of the positioning member 17, respectively, in a state in which the positioning member 17 is detached from the support box 20. The long side surface of the positioning member 17 extends in the front-rear (i.e., widthwise) direction of the image reading apparatus 1.

Figure 8C:
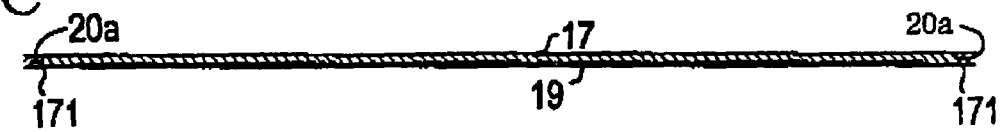
FIG. 8C is a longitudinal cross-section view of the positioning member 17, showing a state in which the positioning member 17 is attached to a support box 20.
Figure 8D:
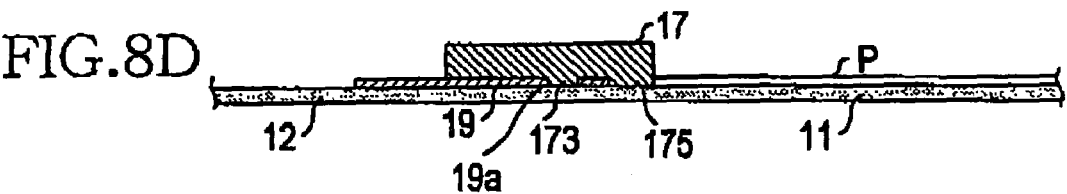
FIG. 8D is a transverse cross-section view of the positioning member 17, showing a state in which the positioning member 17 is attached to the support box 20 and is held in biased contact with an upper surface of the platen glass 13.
Figure 9:
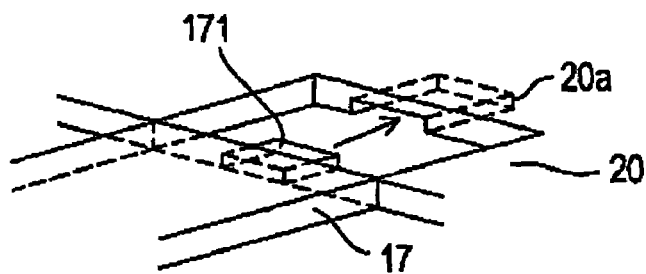
FIG. 9 is a perspective view for explaining a manner in which the positioning member 17 and the support box 20 are connected to each other.

FIGS. 8C and 8D show a longitudinal cross section, and a transverse cross section, of the positioning member 17, respectively, in a state in which the positioning member 17 is attached to the support box 20. The longitudinal cross section of the positioning member 17 extends in the front-rear direction of the DRP image reading apparatus 1; and the transverse cross section of the positioning member 17 extends in the lengthwise direction of the apparatus 1 which is perpendicular to the front-rear direction thereof and in which the image sensor 21 is moved. FIG. 9 shows a manner in which the positioning member 17 is detachably attached to the support box 20.

The positioning member 17 is used, when the user places an original P on the first reading place 11, for positioning the original P at a correct position in the lengthwise direction of the DRP image reading apparatus 1. More specifically described, the user places the original P on the first reading place 11, such that a left-hand end of the original P (FIG. 8D) is in close contact with a right-hand long side surface of the positioning member 17. The positioning member 17 is constituted by a rectangular elongate thin plate having a generally arcuate shape whose lengthwise middle portion is curved toward the platen glass 13. The positioning member 17 is elastically deformable so as to be able to take a flat shape when a force is applied thereto.

The positioning member 17 has two first fitting projections 171 that project from respective lengthwise end surfaces thereof and are connected to two receiving recesses 20a formed in the support box 20, respectively. The positioning member 17 additionally has two second fitting projections 173 that project from the lower surface thereof opposed to the platen glass 13 and fit in two receiving holes 19a of the white standard member 19, respectively. The positioning member 17 has the two second fitting projections 173 at respective positions corresponding to respective positions where the two receiving holes 19a are formed in the white standard member 19.

In addition, the positioning member 17 has a linear projection 175 formed along one long side surface thereof so as to be located on the side of the first reading place 11. The white standard member 19 is detachably attached to a remaining thin portion of the positioning member 17, such that the two second fitting projections 173 projecting from the thin portion fit in the two receiving holes 19a of the standard member 19, respectively and such that a portion of the standard member 19 extends beyond the other long side surface of the positioning member 17.

In a state in which the two first fitting projections 171 of the positioning member 17 to the lower surface of which the white standard member 19 is attached are connected to the two receiving recesses 20a of the support box 20, respectively, the positioning member 17 is elastically deformed to take a flat shape. Thus, the positioning member 17 can be detachably attached to the support box 20. Since the positioning member 17 attached to the support box 20 is elastically deformed and accordingly stores an elastic restoring force, the positioning member 17 is held in pressed contact with the platen glass 13 such that the lengthwise middle portion of the positioning member 13 is biased toward the platen glass 13. One of the two receiving recesses 20a of the support box 20 is formed in a rear side surface of the glass hold-down portion 33 (FIG. 2) extending from the left-hand and front end portion of the box 20; and the other receiving recess 20a is formed in a portion of a front side surface of the frame portion 31 which portion is located on a straight line extending rearward from the front receiving recess 20a in the front-rear direction of the apparatus 1.

As is apparent from the foregoing description of the DRP image reading apparatus 1, the positioning member 17 is detachably attached to the support box 20 and the platen glass 13 defining the first and second reading places 11, 12. Thus, since the user can detach the positioning member 17, he or she can easily carry out the maintenance of the positioning member 17 and the white standard member 19, and additionally the support box 20 and the platen glass 13, i.e., a portion of the apparatus 1 that surrounds the first and second reading places 11, 12. Therefore, in the DRP image reading apparatus 1, dust or the like can be easily removed from small gaps present between the positioning member 17 and the platen glass 13.

In addition, in the DRP image reading apparatus 1, the white standard member 19 is attached to the lower surface of the positioning member 17. Thus, even if the white standard member 19 is stained with dust or the like, the standard member 19 can be easily cleaned. Therefore, the image reading apparatus 1 can prevent production of inappropriate standard data (i.e., inappropriate correction data) at Step S230 of FIG. 6B because of the stain adhered to the white standard member 19, and prevent correction of image data with the inappropriate standard data at Step S240. Moreover, since the positioning member 17 and the white standard member 19 can be easily detached from the support box 20, those members 17, 19 can be easily replaced with counterparts.

Figure 14:
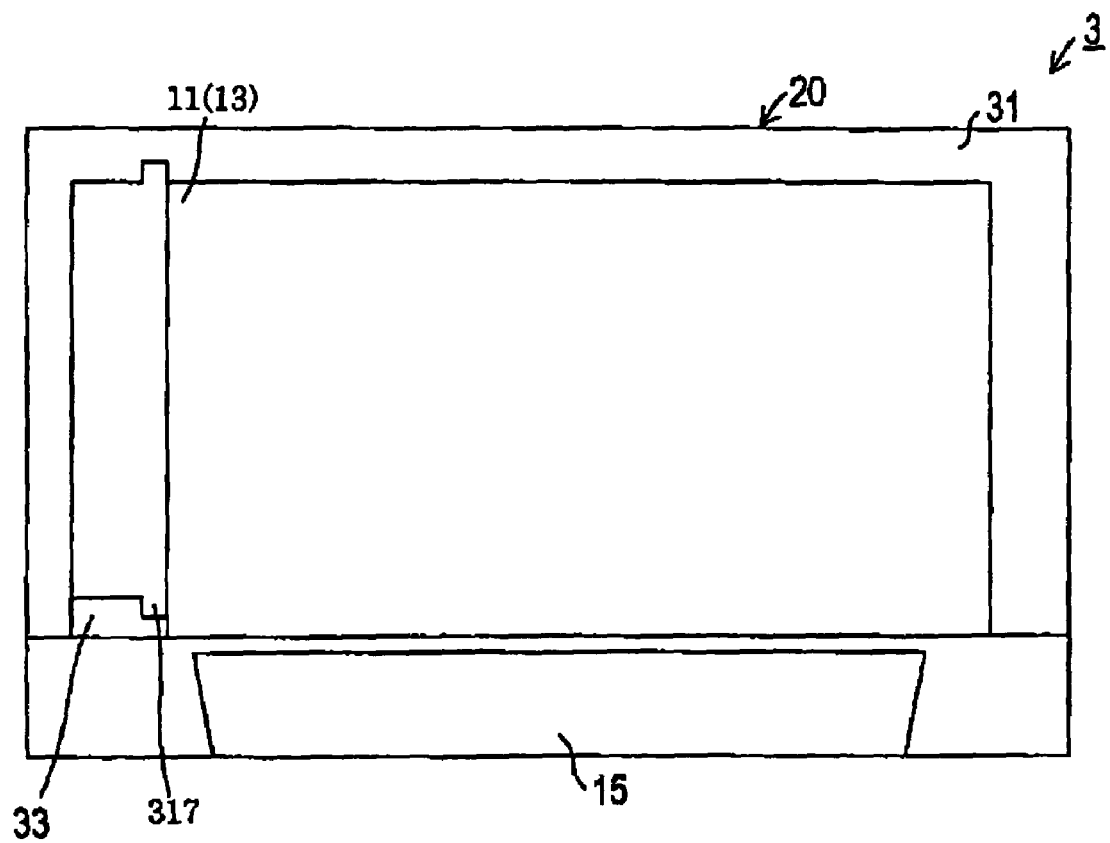
FIG. 14 is a plan view corresponding to FIG. 2, showing a positioning member 317 placed on a platen glass 13 of the apparatus 300.
Figure 15:
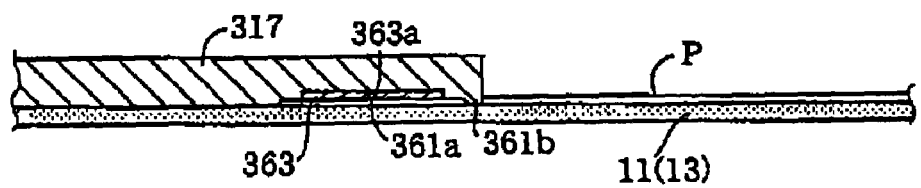
FIG. 15 is a transverse cross-section view of the positioning member 317 and a white standard member 863 detachably attached to the positioning member 317.

Since various sorts of positioning member 17 can be easily attached to, and detached from, the support box 20 of the main body 3, the main body 3 can be easily modified so as to be employed by either a DRP image reading apparatus 1 of a type including the original feeding device 40, as shown in FIG. 1, or a single-reading-place (SRP) image reading apparatus 300 of a type not including the original feeding device 40, as shown in FIG. 13. For example, in the case where the positioning member 17 shown in FIG. 2 is replaced with a different sort of positioning member 317, shown in FIG. 14, that has a width sufficiently great to cover the second reading place 12, the main body 3 can be employed by the SRP image reading apparatus of the type not including the original feeding device 40. The positioning member 317 has a linear projection 361b corresponding to the linear projection 175 of the positioning member 17, and two fitting projections 361a that are fitted in two receiving holes 363a of a white standard member 363. However, each of the positioning members 17, 61 (shown in FIGS. 10A and l0B, and described later), 161 (shown in FIG. 11, and described later), 271 (shown in FIG. 12, and described later) may be employed by the SRP image reading apparatus 300 shown in FIG. 13.

In addition, the positioning member 17 is constituted by the elongate elastic member whose lengthwise middle portion is curved toward the platen glass 13 (or the first and second reading places 11, 12) in the state in which the positing member 17 is not attached to the support box 20. And, the positioning member 17 is attached to the support box 20 such that the positioning member 17 is elastically deformed and stores the elastic restoring force. Thus, the lengthwise middle portion of the positioning member 17 is strongly biased toward the platen glass 13, so that the original P can be effectively prevented from entering a space that would otherwise possibly occur between the positioning member 17 and the platen glass 13 at the boundary between the first and second reading places 11, 12.

In particular, in the DRP image reading apparatus 1, the positioning member 17 has the linear projection 175 along one long side surface thereof that is located on the side of the first reading place 11 and extends in the direction perpendicular to the direction in which the image sensor 21 is moved. And, the linear projection 175 of the positioning member 17 is strongly biased toward the platen glass 13. Thus, the original P placed on the first reading place 11 by the user can be more effectively prevented from entering a space that might occur between the positioning member 17 and the platen glass 13.

In the first embodiment shown in FIGS. 1A through 9, the positioning member 17 includes the single linear projection 175 located on the side of the first reading place 11. However, the positioning member 17 may be modified to have two linear projections that are symmetrical with each other with respect to a longitudinal axis line thereof perpendicular to the direction of movement of the image sensor 21, as shown in FIGS. 10A and 10B.

Figure 10A:
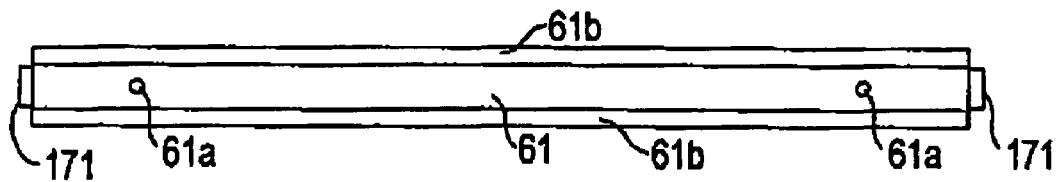
FIG. 10A is a bottom view of another positioning member 61 as a second embodiment of the present invention.
Figure 10B:
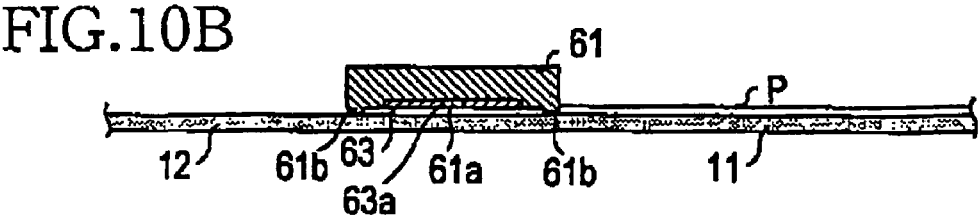
FIG. 10B is a transverse cross-section view of the positioning member 61.

FIG. 10A shows a lower surface of a positioning member 61 as a second embodiment of the present invention that may be employed in place of the positioning member 17 by the DRP image reading apparatus 1 shown in FIGS. 1A and 1B; and FIG. 10B shows a transverse cross section of the positioning member 61, taken in the lengthwise direction of the apparatus 1. Like the positioning member 17, the positioning member 61 is constituted by a rectangular elongate thin elastic plate whose lengthwise middle portion is curved toward the platen glass 13.

When a force is applied to the positioning member 61, the positioning member 61 is elastically deformed to store a restoring force. Like the positioning member 17, the positioning member 61 has, on lengthwise opposite end surfaces (i.e., two short side surfaces) thereof, two first fitting projections 171 that fit in two receiving recesses 20a, respectively, that are formed in the support box 20. In addition, the positioning member 61 has, at respective positions corresponding to two receiving holes 63a of a white standard member 63, two second fitting projections 61a that fit in the two receiving holes 63a, respectively. Like the white standard member 19, the white standard member 63 is used for correcting image data representing an image taken by the image sensor 21.

The positioning member 61 has two linear projections 61b along two long side surfaces thereof respectively, that are located on the side of the first reading place 11 and on the side of the second reading place 12, respectively, and extend in the direction perpendicular to the direction of movement of the image sensor 21. The two linear projections 61b are symmetrical with each other with respect to a longitudinal axis line thereof perpendicular to the direction of movement of the sensor 21. The white standard member 63 is attached to a lower surface of the positioning member 61 such that the two fitting projections 61a of the positioning member 61 fit in the two receiving holes 63a of the standard member 63, and such that the standard member 63 as a whole fits in an elongate recess defined by, and between, the two linear projections 61b.

The positioning member 61 to the lower surface of which the white standard member 63 is attached is attached to the support box 20 in a state in which the two first fitting projections 171 of the positioning member 61 fit in the two receiving recesses 20a of the box 20, respectively, and is elastically deformed to be flat on the platen glass 13 and be biased against the same 13.

Since the positioning member 61 has the two linear projections 61b symmetrical with each other with respect to the longitudinal axis line thereof the positioning member 61 can be stably attached to the support box 20 and can be prevented from being displaced in the direction of movement of the image sensor 21.

Figure 11:
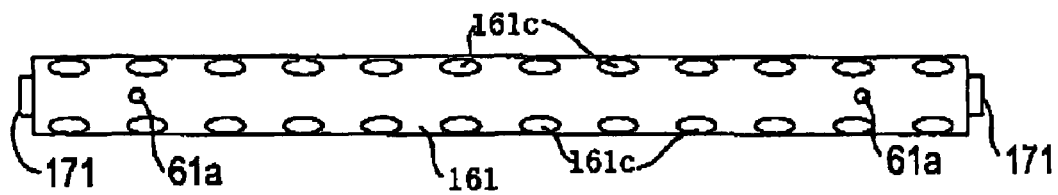
FIG. 11 is a bottom view of another positioning member 161 as a third embodiment of the present invention.

However, in each of the first and second embodiments, the positioning member 17, 61 may be modified to have, in place of the one linear projection 175 or the two linear projections 61b, a plurality of bosses arranged in one or two arrays in the lengthwise direction thereof as shown in FIG. 11.

FIG. 11 shows a lower surface of a positioning member 161 as a third embodiment that may be employed in place of the positioning member 17 or 61 by the DRP image reading apparatus 1 shown in FIGS. 1A and 1B. The positioning member 161 has, on the lower Ice thereof a plurality of bosses 161c that are arranged in two arrays in a lengthwise direction of the member 161 such that the two arrays of bosses 161c are axis-symmetrical with each other with respect to a longitudinal axis line (or centerline) of the member 161. Thus, the positioning member 161 enjoys a reduced production cost because of a reduced amount of raw materials.

Meanwhile, in each of the above-described embodiments, the positioning member 17, 61, 161 is detachably attached to the support box 20 in such a manner that the two fitting projections 171 fit in the two receiving recesses 20a, respectively. However, a positioning member may be attached, with one or more screws, to the support box 20, as shown in FIG. 12.

Figure 12:
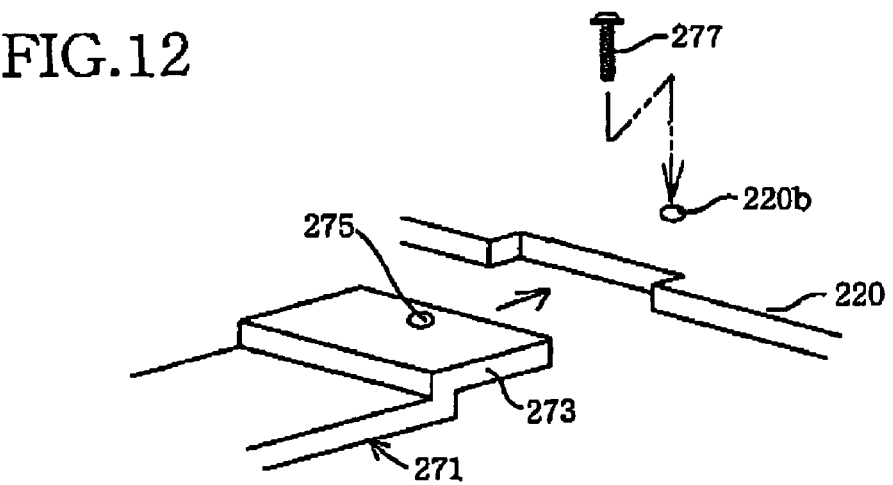
FIG. 12 is a perspective view of another positioning member 271 as a fourth embodiment of the present invention.

FIG. 12 shows a positioning member 271 as a fourth embodiment that may be employed in place of the positioning member 17, 61, 161 in the DRP image reading apparatus 1 shown in FIGS. 1A and 1B. In the fourth embodiment, however, the image reading apparatus 1 employs, in place of the support box 20, a support box 220 that has, in place of the two receiving recesses 20a, two threaded holes 220b (only one hole 220b is shown in FIG. 12) in which two screws 277 are to be screwed, respectively. The positioning member 271 includes, in lengthwise opposite end portions thereof, two connection portions 273 that are to be connected to the support box 220 and have two non-threaded holes 275, respectively, that can be aligned with the two threaded holes 220b of the box 220, respectively. The positioning member 271 is attached to the support box 220 in such a manner that the two screws 277 are inserted in the two non-threaded holes 275 of the positioning member 271, respectively, and are screwed in, i.e., threadedly engaged with, the two threaded holes 220b of the box 220, respectively. In this modified apparatus 1, the positioning member 271 can be surely attached with the screws 277 to the support box 220.

In each of the above-described embodiments, the image sensor 21 provides an image taking device; the CPU 101 and a portion of the reading control portion 107 that carries out Step S160 of FIG. 6A cooperate with each other to provide a first reading control portion; and the CPU 101 and a portion of the reading control portion 107 that carries out Step S130 of FIG. 6A cooperate with each other to provide a second reading control portion. In addition, the linear projection or projections 175, 61b, 361b of the positioning member 17, 61, 271, 317 or the arrays of bosses 161c of the positioning member 161 provides or provide one or more projections provided on the lower surface of the positioning member; and the lower surface of the white standard member 19, 63 that contacts the platen glass 13 provides a standard image to be read by the image sensor 21 as the image taking device. The fitting projections 171 of the positioning member 17, 61, 161, 317, and the receiving recesses 20a of the support box 20 cooperate with each other to provide a detachably attaching device that detachably attaches the positioning member to the support box 20. Likewise, the two screws 277, the two threaded holes 220b of the support box 220, and the two non-threaded holes 275 of the positioning member 271 cooperate with each other to provide the detachably attaching device.

While the present invention has been described in its preferred embodiments, it is to be understood that the present invention is by no means limited to the details of the described embodiments but may otherwise be embodied.

For example, in each of the above-described embodiments, the positioning member 17, 61, 161, 271, 317 is formed as a member separate from the white standard member 19, 63, 363. However, it is possible to employ a single member that functions as not only a positioning member but also a standard member. For example, in the case where a positioning member is formed of a white material (e.g., a white plastic material), the positioning member can also function as a standard member. In this case, a lower surface of the positioning member provides a standard image, and accordingly the positioning member need not have any fitting projections similar to the fitting projections 173, 61a, 361a of the positioning member 17, 61, 161, 271, 317.

In each of the illustrated embodiments, if between the positioning member 17, 61, 161, 271, 317 and the upper surface of the platen glass 13 that defines the first reading place 11, there occurs a large gap which an original sheet can enter, the positioning member cannot its proper function of positioning the original sheet on the first reading place 11. Hence, in each illustrated embodiment, the positioning member 17, 61, 161, 271, 317 is constituted by the elastically deformable elongate member whose lengthwise middle portion is curved in the state in which the elongate member is not attached to the support box 20. The positioning member is attached to the support box in such a manner in which from a state in which the positioning member takes a posture in which the lengthwise opposite end portions of the positioning member is remoter from the platen glass 13 than the lengthwise middle portion of the positioning member, the positioning member is elastically deformed by moving the opposite end portions thereof relative to the middle portion thereof toward the platen glass 13, and the two fitting projections 171 of the positioning member are connected to the two receiving recesses 20a of the support box 20, respectively. Thus, the lengthwise middle portion of the positioning member is biased toward the platen glass 13 because of the elastic restoring force of the deformed positioning member. Thus, in a free state in which the positioning member is free of binding, the positioning member takes a generally arcuate shape. Therefore, in the state in which the positioning member is attached to the support box 20, i.e., is bound by the same 20, an elastic restoring force is produced in the positioning member so as to restore its original shape in its free state from that in its bound state. Consequently the lengthwise middle portion of the positioning member is strongly pressed against the platen glass 13. Thus, in the present image reading apparatus 1, there occur no gaps which the original sheet can enter, between the positioning member and the platen glass 13, and the positioning member can satisfactorily show its proper function.

In each of the embodiments shown in FIGS. 8B, 10A, and 11, the positioning member 17, 61, 161 has, on the lower surface thereof opposed to the boundary between the first and second reading places 11, 12, the linear projection or projections 175, 61b, 361b or the arrays of bosses 161c as one or more projections that is or are oriented in the direction parallel to the platen glass 13 and perpendicular to the direction in which the image sensor 21 is moved below the first and second reading places 11, 12. The linear projection or projections 175, 61b, 361b or the arrays of bosses 161c projects or project from the lower surface of the positioning member that extends parallel to the upper surface of the platen glass 13 that defines the first reading place 11, and is or are oriented in the direction perpendicular to the direction of movement of the image sensor 21. Since the linear projection or projections or the arrays of bosses is or are strongly pressed against the platen glass 13, there occur no gaps which the original sheet can enter, between the positioning member and the platen glass 18.

In the second embodiment shown in FIG. 10A, the positioning member 61 has, on the lower surface thereof, the two linear projections 61b that are symmetrical with each other with respect to the longitudinal axis line of the positioning member 61 that extends in the direction perpendicular to the direction of movement of the image sensor 21. Thus, the positioning member 61 can be stably attached to the support box 20. For example, the positioning member 17 shown in FIG. 8B has the single linear projection 175 that is located only on the side of the first reading place 11, and thus has an asymmetrical shape with respect to the longitudinal axis line thereof. In this case, the middle portion of the positioning member 17 may be more or less elastically deformed in the direction of movement of the image sensor 21. In contrast thereto, the positioning member 61 has the two linear projections 61b that are symmetrical with each other with respect to the longitudinal axis line thereof extending in the direction perpendicular to the direction of movement of the image sensor 21, the positioning member 61 can be stably attached to the support box 20. In particular, the positioning member 61 has the two linear projections 61b projecting from opposite end portions of the lower surface thereof that are opposite to each other in the direction of movement of the image sensor 21. Thus, the lengthwise middle portion of the positioning member 61 can be effectively prevented from being elastically deformed in the direction of movement of the image sensor 21.

In each of the illustrated embodiments, the lower surface of the positioning member 17, 61, 161, 271, 317 provides the standard image that is taken by the image sensor 21 to obtain the standard (correction) data to correct the image data representing the image taken by the same 21 from the original, Since the image sensor 21 can be opposed to the lower surface of the positioning member through the platen glass 13, the image sensor 21 can easily obtain the standard data. Since the positioning member is detachable from the support box 20, not only the positioning member but also the standard image can be easily maintained. For example, if the positioning member is detached from the support box 20, then the standard image and the first and second reading places 11, 12 can be easily cleaned. Thus, the correction of the image data obtained by the image sensor 21 from the original can be appropriately red out without being adversely affected by, e.g., stains adhered to the standard image. In addition, when one positioning member is replaced with another positioning member, one standard member can be replaced with another standard member.

In each of the illustrated embodiments, the DRP or SRP image reading apparatus 1, 300 employs the standard member 19, 63, 363 at least a portion of the upper surface of which is detachably attached to at least a portion of the lower surface of the positioning member 17, 61, 161, 271, 317, such that the lower surface of the standard member provides the standard image. Thus, the standard member 19, 63, 363 can be easily replaced with another standard member, and can be easily maintained (e.g., cleaned). Therefore, the correction of the image data obtained by the image sensor 21 from the original can be appropriately carried out without being adversely affected by, e.g., stains adhered to the standard image.

However, the standard member 19, 63, 368 may be fixed to the positioning member 17, 61, 161, 271, 317, by adhesion, e.g., a double-coated adhesive tape. In this case, the standard member can be easily provided under the positioning member, and the positioning member and the standard member enjoy simple structures, i.e., need not have any projecting portions 173, 61a, 361a or any receiving holes 19a, 63a, 363a that are used to connect the two members to each other. Alternatively, the standard image may be directly formed on the lower surface of the positioning member.

In each of the illustrated embodiments, the image sensor 21 takes, through the platen glass 13, the image from the original fed to the second reading place 12 by the original feeding device 40. However, in the case where a sheet guiding device is employed which supports and guides an original sheet fed to the second reading place 12, the image sensor 21 may take an image formed on the original directly, i.e., without via the platen glass 13. In this case, the length of the platen glass 13 can be reduced.

In each of the illustrated embodiments, the positioning member 17, 61, 161, 271, 317 is detachable from the support box 20, 220 as the housing, without damaging the shape of each of the positioning member and the support box. In particular, in each of the illustrated embodiments except for the embodiment shown in FIG. 12, the positioning member 17, 61, 161, 317 is detachable from the support box 20, 220 without using a tool such as a screw driver.

It is to be understood that the present invention may be embodied with various changes, modifications, and improvements that may occur to a person skilled in the art without departing from the spirit and scope of the invention defined in the appended claims.

What is claimed is:

1. An image reading apparatus, comprising:
   a transparent plate;
   a positioning member which is provided on the transparent plate so as to define, on one of opposite sides of the positioning member, a first reading place where a first sheet having a first image is placed, and which positions the first sheet placed on the first reading place;
   an image taking device;
   a housing which supports the transparent plate and accommodates the image taking device such that the image taking device is movable below, and along, the transparent plate;
   a first reading control portion which controls the image taking device to take, through the transparent plate, the first image from the first sheet placed on the first reading place, while the image taking device is moved below, and along, the transparent plate, and
   a detachably attaching device which attaches the positioning member to the housing such that the positioning member is detachable from the housing.

2. The image reading apparatus according to claim 1, wherein the positioning member provided on the transparent plate defines, on an other of the opposite sides of the positioning member, a second reading place, and wherein the apparatus further comprises:
   a second-sheet feeding device which is provided above the second reading place and which feeds a second sheet having a second image, to the second reading place; and
   a second reading control portion which controls, in a state in which the image taking device is positioned below the second reading place, the second-sheet feeding device to feed the second sheet to the second reading place, and controls, when the second sheet is fed through the second reading place, the image taking device to take the second image from the second sheet.

3. The image reading apparatus according to claim 2, further comprising a cover member which is pivotable in a first direction away from the housing so as to allow the first sheet to be placed on the first reading place by a user, and in a second direction toward the housing so as to allow the second sheet to be fed to the second reading place by the second-sheet feeding device, wherein the second-sheet feeding device is integrally assembled with the cover member.

4. The image reading apparatus according to claim 2, further comprising a moving device which moves the image taking device and positions the image taking device below the second reading place, wherein the second reading control portion comprises a computer which controls the image taking device, the moving device, and the second-sheet feeding device.

5. The image reading apparatus according to claim 2, wherein the positioning member and the second-sheet feeding device are located on a side of one of opposite end surfaces of the transparent plate that are opposite to each other in a movement direction in which the image taking device is moved below the transparent plate.

6. The image reading apparatus according to claim 1, wherein the positioning member provided on the transparent plate covers a second portion of the transparent plate that is other than a first portion thereof that defines the first reading place.

7. The image reading apparatus according to claim 1, wherein the positioning member is detachable from the housing without damaging a shape of each of the positioning member and the housing.

8. The image reading apparatus according to claim 1, wherein the positioning member is detachable from the housing without using a tool.

9. The image reading apparatus according to claim 1, wherein the detachably attaching device comprises at least one fitting projection and at least one receiving recess in which said at least one fitting projection is fitable, and wherein the positioning member has one of (a) said at least one fitting projection and (b) said at least one receiving recess, and the housing has an other of (a) said at least one fitting projection and (b) said at least one receiving recess.

10. The image reading apparatus according to claim 1, wherein the detachably attaching device comprises at least one screw, and at least one threaded hole and at least one non-threaded hole, wherein in a state in which said at least one threaded hole and said at least one non-threaded hole are aligned with each other, said at least one screw is screwed in said at least one threaded hole and is inserted in said at least one non-threaded hole, and wherein the positioning member has one of (a) said at least one threaded hole and (b) said at least one non-threaded hole and the housing has an other of (a) said at least one threaded hole and (b) said at least one non-threaded hole.

11. The image reading apparatus according to claim 1, wherein the positioning member comprises an elastically deformable elongate member which is curved in a state thereof in which the elongate member is not attached to the housing.

12. The image reading apparatus according to claim 11, wherein the elongate member is attached to the housing such that from a state in which the elongate member takes a posture in which lengthwise opposite end portions of the elongate member is remoter from the transparent plate than a lengthwise middle portion of the elongate member, the elongate member is elastically deformed by moving the opposite end portions thereof relative to the middle portion thereof toward the transparent plate, and the middle portion thereof is biased, owing to an elastic restoring force of the opposite end portions thereof, toward the transparent plate.

13. The image reading apparatus according to claim 1, wherein the positioning member has, on a lower surface thereof adapted to be opposed to the transparent plate, at least one projection, and wherein in a state in which the positioning member is attached to the housing, said at least one projection is arranged in a direction parallel to the transparent plate and perpendicular to a movement direction in which the image taking device is moved below the transparent plate.

14. The image reading apparatus according to claim 13, wherein the positioning member has, on the lower surface thereof, two projections which are symmetrical with each other with respect to an axis line of the positioning member, and wherein in a state in which the positioning member is attached to the housing, the axis line of the positioning member extends in a direction perpendicular to the movement direction.

15. The image reading apparatus according to claim 13, wherein the positioning member has, on the lower surface thereof, two projections which project from opposite end portions of the positioning member, and wherein in a state in which the positioning member is attached to the housing, the opposite end portions of the positioning member are opposite to each other in the movement direction.

16. The image reading apparatus according to claim 13, wherein the positioning member has, on the lower surface thereof, a plurality of projections arranged in at least one array, and wherein in the state in which the positioning member is attached to the housing, the projections are arranged in said at least one array in the direction perpendicular to the movement direction.

17. The image reading apparatus according to claim 1, wherein the positioning member has, on a lower surface thereof adapted to be opposed to the transparent plate, a standard image which is taken by the image taking device to obtain standard image data which is used to correct first image data representing the first image taken by the image taking device.

18. The image reading apparatus according to claim 17, further comprising a standard member at least a portion of an upper surface of which is detachably attached to at least a portion of the lower surface of the positioning member, such that a lower surface of the standard member provides the standard image.

19. The image reading apparatus according to claim 18, wherein the standard member has one of (a) a plurality of fitting projections and (b) a plurality of receiving holes, and the positioning member has an other of (a) the fitting projections and (b) the receiving holes, and wherein the standard member is attached to the positioning member such that the fitting projections are fitted in the receiving holes, respectively.

20. The image reading apparatus according to claim 17, further comprising a standard member at least a portion of an upper surface of which is attached, by adhesion, to at least a portion of the lower surface of the positioning member, such that a lower surface of the standard member provides the standard image.

21. The image reading apparatus according to claim 20, wherein the standard member is attached with a double-coated adhesive tape to the positioning member.

22. The image reading apparatus according to claim 1, further comprising a cover member which is pivotable in a first direction away from the housing so as to allow the first sheet to be placed on the first reading place by a user, and in a second direction toward the housing so as to hold the first sheet on the first reading place.

23. The image reading apparatus according to claim 1, wherein the image taking device includes a plurality of image sensing elements arranged in at least one array in a direction parallel to the transparent plate and perpendicular to a direction in which the image taking device is moved below the transparent plate.

24. The image reading apparatus according to claim 1, further comprising a moving device which moves the image taking device below, and along, the transparent plate, wherein the first reading control portion comprises a computer which controls the image taking device and the moving device.

25. The image reading apparatus according to claim 1, wherein the positioning member provided on the transparent plate defines, on an other of the opposite sides of the positioning member, a second reading place.

* * * * *